United States Patent Office

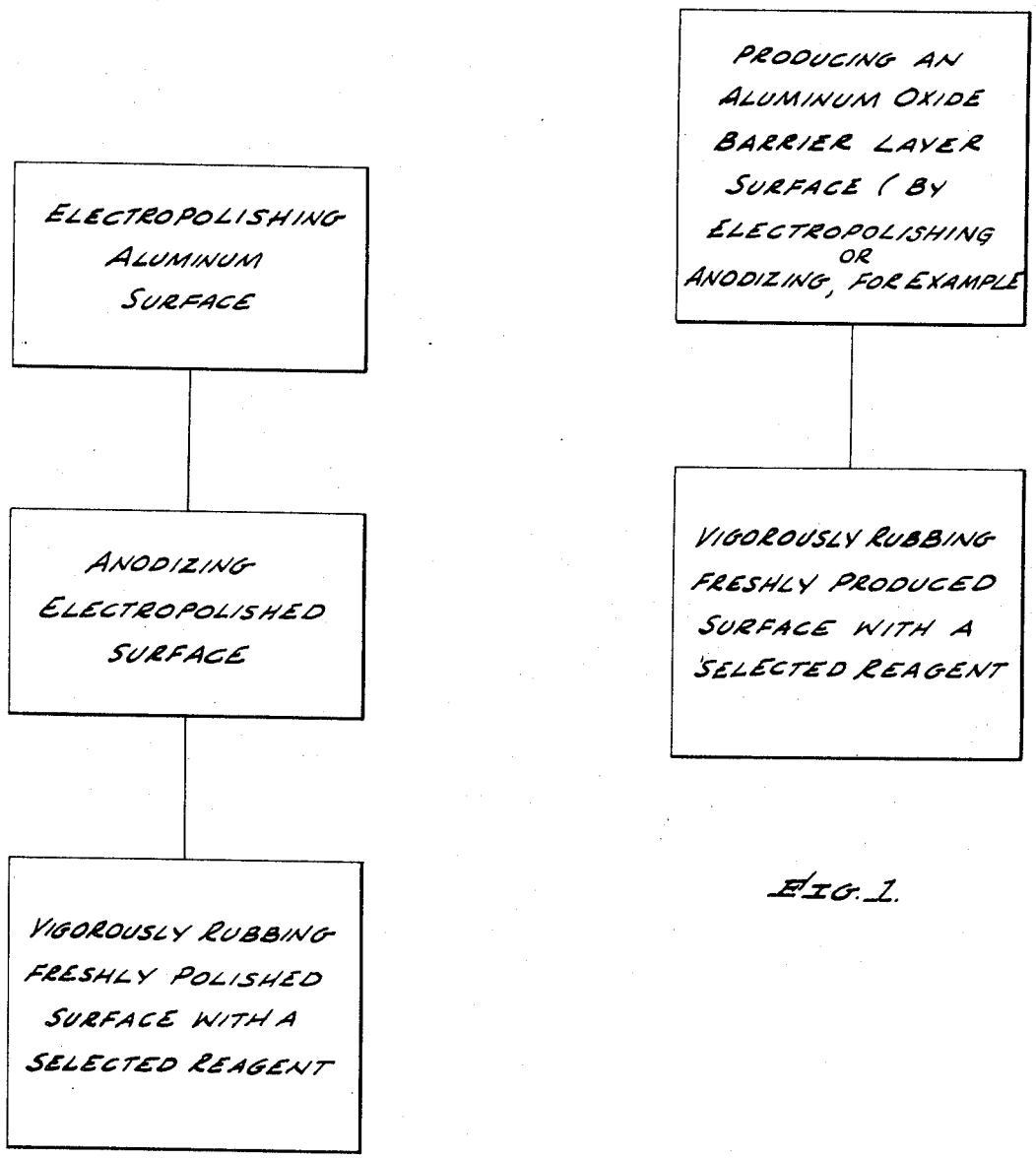

3,734,837
Patented May 22, 1973

---

3,734,837
METHOD OF HARDENING POLISHED ALUMINUM SURFACES
George R. Blair, Culver City, and Francois J. Ricaud, Pico Rivera, Calif., assignors to Hughes Aircraft Company, Culver City, Calif.
Filed July 8, 1969, Ser. No. 843,910
Int. Cl. C23b 3/06, 9/02
U.S. Cl. 204—36     2 Claims

ABSTRACT OF THE DISCLOSURE

A method of providing a scratch resistant aluminum surface wherein a freshly processed aluminum oxide barrier layer surface is vigorously rubbed with soft absorbent material saturated with a water soluble hydroxylated compound such as, for example, methanol, water, hydroxyacetic acid, monoethanolamine, ethylene glycol and monoethyl ether of ethylene glycol. The latter step may also directly follow an electropolishing and/or an anodizing treatment.

---

The invention herein described was made in the course of or under a contract or subcontract thereunder with the Department of the Air Force.

This invention relates generally to the hardening of an aluminum surface and more particularly to a method of providing scratch resistant surfaces on tools, household and industrial fixtures and also scratch resistant polished aluminum in laser pump cavities, for example.

It is well known that aluminum surfaces are prone to become scratched when coming into contact with a slight abrasive force from even dull objects such as fingernails, wood, plastics and the like. This factor has made it generally undesirable to manufacture precision and common tools and fixtures using this material, even though aluminum has other desirable characteristics such as being strong and very light. Also, other very important characteristics are its high heat conductivity, its ability to be easily fabricated into any desirable shape and to provide a highly specularly reflective surface. These latter characteristics make aluminum extremely well suited for use in highly reflective pump cavities which efficiently couple the radiant output of a pump flash lamp or other radiant energy source to an active laser element in a laser.

In the past, laser pump cavities have been fabricated from a variety of materials which are suitable to the laser pump cavity environment. These materials are capable of being shaped to provide an internal cavity having a desired geometric configuration and a cavity surface having the desired degree of reflectivity to permit and support laser action. As noted above, aluminum is probably one of the more common materials employed in the fabrication of laser pump structures since it is easily worked and may be shaped and polished to a geometrically accurate, highly lustrous surface finish having high reflectivity. While this material provides ease of fabrication and initial desirable reflective properties, the reflective surface tends to become scratched when attempts are made to clean the polished surface. It has been found that even the use of extremely soft material causes undesirable scratches that greatly degrade the reflectivity property of the mirrored area. This leads to the costly replacement of the cavities, loss of the use of the laser while its cavity is being replaced, and also loss of pumping efficiency if not replaced.

Various techniques have been developed over the years endeavoring to overcome the problem of proneness to scratching. One such technique is that of coating the aluminum with one or more layers of shiny metals, such as silver, and additionally coating that surface with a low absorption, transparent, dielectric material to protect the surface from degradation. This method, while obtaining good results, is rather complicated and costly.

Another technique used is that of anodizing the aluminum surface to provide a very thin barrier layer surface film that tends to inhibit environmental degradation of the desired reflective properties of the cavity. However, due to the nature of operation of laser cavities, all contaminants cannot be prevented from coming into contact with and deposited on the polished reflective surface. For example, most high power lasers require air cooling to prevent damage to the active laser element and to the pump energy source. This leads to small particles coming into contact with the pump cavity wall since no filter system can remove all contaminants from the system. Thus, in this case also, the surface must be cleaned periodically and generally produces scratches. It should be clear from the foregoing that a technique which would allow the cavity to be periodically cleaned without the danger of scratching the highly reflective surface would be a significant advancement in the art.

Accordingly, it is a basic object of the present invention to provide a method for producing a scratch resistant aluminum surface.

It is another object of the invention to provide a method for producing a scratch resistant polished aluminum surface.

It is also another object of this invention to provide a technique whereby an anodized polished aluminum surface may be hardened without degrading the reflectivity of the surface.

It is still another object of the invention to provide a highly stable scratch resistant laser pump cavity surface.

These and other objects of the present invention are obtained according to one embodiment thereof by the steps of electropolishing a selected aluminum surface and then vigorously rubbing the freshly polished surface with a soft absorbent material saturated with a water soluble hydroxylated compound, such as for example, water, methanol, lactic acid, triethanolamine, ethylene glycol, or diethanolamine. Also, the polished surface may first be anodized to produce an aluminum oxide barrier layer on the surface just prior to the rubbing step.

The process of the invention and specific embodiments thereof will be described hereinafter by way of example and with reference to the accompanying drawing in which:

FIG. 1 is a flow diagram of a presently preferred embodiment of the invention; and FIG. 2 is a flow chart of another embodiment of the present invention.

As noted previously, a scratch resistant aluminum surface is highly desirable and is now attainable by following the new and novel methods described herein. Basically, this method comprises the steps of processing the aluminum surface to be hardened to form thereon an aluminum oxide barrier layer and then vigorously rubbing the freshly processed surface with a soft absorbent material, such as a cotton swab, which is saturated with a water soluble hydroxylated compound.

The processing of the aluminum to produce the barrier layer may take any of several forms such as anodizing, electropolishing, a combination of these, to name but a few. Where the aluminum surface is not to be highly reflective, the surface need not be polished, but a smooth surface is preferable. The aluminum oxide barrier layer may then be formed on this smooth surface by conventional means such as anodizing, for example.

Where a highly reflective surface is desired, preferably, the surface is both mechanically polished and then electropolished. Electropolishing itself produces the desired barrier layer on the aluminum surface and this step is followed by the step of vigorously rubbing the polished surface with a soft absorbent swab saturated with a selected reagent, as shown in FIG. 1.

Any conventional mechanical polishing technique may be used but grinding materials which might become embedded in aluminum surfaces should be avoided. Grit blasting or liquid honing should also be avoided as such surfaces are extremely difficult to polish. The polishing may, for example, comprise the conventional operations, using suitable polishing compound and a buffing wheel, of (1) cutting, (2) cutting and coloring, and (3) color buffing. After final buffing, the aluminum may be cleaned by such conventional processes as (1) ultrasonic cleaning, (2) vapor degreasing, or (3) hand solvent cleaning.

Once the polished surface to be hardened has been mechanically prepared, the workpiece may be electropolished by any technique well known in the art. For example, the parts to be processed may be connected to an anode terminal of a low voltage direct current supply and immersed in a sodium carbonate and tribasic sodium phosphate solution held in a metal container to which the cathode terminal of the power supply is connected. The set-up may be agitated and the power supply adjusted to deliver about 7 volts at 2 amperes for a period of between 15 and 30 minutes. Upon completion of this step, the aluminum (with its newly obtained aluminum oxide barrier layer) should be thoroughly washed in distilled water.

As shown in FIG. 1, the freshly polished surface may then be vigorously rubbed with a soft cotton swab saturated with a water soluble hydroxylated compound. In the case of polished surfaces, this compound should be selected from those that occupy this class that do not leave a residue on the burnished aluminum. The following is a listing of selected reagents which meet these criteria, and the formulas and compounds are listed along with additional materials in each class and their connection with the formula:

Class of alcohols: $ROH$

| | |
|---|---|
| Methanol | ($R = CH_3-$) |
| Ethanol | ($R = CH_3CH_2-$) |
| Propanol | ($R = CH_3CH_2CH_2-$) |
| Isopropanol | $\left(R=\begin{matrix}CH_3\\ \phantom{x}\\ CH_3\end{matrix}\!\!CH-\right)$ |
| Water | ($R = H-$) |

Class of hydroxyacids: $RCHOHCOOH$

| | |
|---|---|
| Hydroxyacetic acid | ($R = H-$) |
| Lactic acid | ($R = CH_3-$) |

Class of hydroxyamines: $[RCHOH-CH_2-]_x NH_{(3-x)}$
$x = 1, 2$ or $3$

| | |
|---|---|
| Monoethanolamine | ($R=H-$, $x=1$) |
| Diethanolamine | ($R=H-$, $x=2$) |
| Triethanolamine | ($R=H-$, $x=3$) |
| Monopropanolamine | ($R=CH_3-$, $x=1$) |

Class of polyhydric alcohols: $HO-[\underset{\underset{R}{|}}{CH}-CH_2-O]_n H$
$n = 1, 2, 3$

| | |
|---|---|
| Ethylene glycol | ($R=H-$, $n=1$) |
| Diethylene glycol | ($R=H-$, $n=2$) |
| Triethylene glycol | ($R=H-$, $n=3$) |
| Propylene glycol | ($R=CH_3-$, $n=1$) |
| Glycerine | ($R=-CH_2OH$, $n=1$) |

Class of ether-alcohols: $R'O-[\underset{\underset{R}{|}}{CH}-CH_2-O]_n H$
$n = 1, 2, 3$

| | |
|---|---|
| Monoethyl ether of ethylene glycol | ($R=H-$, $R'=C_2H_5-$, $n=1$) |
| Monoethyl ether of diethylene glycol | ($R=H-$, $R'=C_2H_5-$, $n=2$) |

The vigorous rubbing or burnishing with the selected reagent may be accomplished with any normal hand burnishing motion such as back and forth and/or circular. This procedure is followed, using medium hand pressure, for a period of about a minute for any given area of surface. Of course, care should be taken to avoid applying so much pressure that the surface layer is damaged or scratched.

An alternative procedure to the one described above is shown in FIG. 2. Here, the additional step of barrier layer anodizing the freshly electropolished surface is followed prior to the burnishing. Any conventional barrier layer anodizing procedure may be followed, such as for example, those using a boric acid bath or an ammonium tartrate bath. Thus, the anode connected aluminum parts may be placed in the bath for about 1½ to 2½ minutes with a supply voltage set between 45 and 50 volts. A more complete description of the electropolishing and anodizing procedures may be obtained from any of many texts on the subject. Such a text is "Surface Treatment of Aluminum" by S. Wernick and R. Pinner, published by Robert Draper, Ltd., 3rd edition, Teddington, England (1964).

From the foregoing, it should be seen that the invention provides a new and useful method of hardening the surface of aluminum so that it will resist scratching. This technique has been shown to be extremely advantageous in the field of laser pump cavity fabrication.

In practicing the invention, any material in the class prescribed which exhibits the qualities described may be substituted for the particular reagents specified. Also, any process which produces the desired aluminum oxide barrier layer (prior to the burnishing step) may be utilized.

From the foregoing, it should be clear that the invention is susceptible to numerous modifications within the skill of the routine engineer and without the exercise of the inventive faculty. Accordingly, the scope of this invention is defined by the scope of the claims.

What is claimed is:

1. A method of providing a hardened, scratch resistant surface on an aluminum specimen comprising the steps of:
   forming a hardened aluminum oxide layer on the aluminum specimen by a process selected from the group consisting of electropolishing, anodizing and the combination of electropolishing and anodizing; and
   rubbing the barrier layer with a soft absorbent material saturated with a water soluble polar hydroxylated compound for a period of time and with a pressure sufficient to further harden the aluminum oxide barrier layer, the polar hydroxylated compound selected from the groups consisting of
(a) methanol, ethanol, propanol and isopropanol;
(b) hydroxyacetic acid and lactic acid;
(c) monoethanolamine, diethanolamine, triethanolamine, and monopropanolamine;
(d) ethylene glycol, diethylene glycol, triethylene glycol, propylene glycol, and glycerine; and
(e) ethylene glycol and a monoethyl ether of diethylene glycol.

2. A method of providing a hardened, scratch resistant surface on an aluminum specimen comprising the steps of:
forming a hardened aluminum oxide layer on the aluminum specimen by a process selected from the group consisting of electropolishing, anodizing, and the combination of electropolishing and anodizing; and
rubbing the barrier layer with a soft absorbent material saturated with a water soluble polar hydroxylated compound selected from the group consisting of methanol, ethanol, propanol and isopropanol for a period of time and with a pressure sufficient to further harden the aluminum oxide barrier layer.

References Cited

UNITED STATES PATENTS

| | | | |
|---|---|---|---|
| 1,869,058 | 7/1932 | Gower | 204—36 |
| 3,031,387 | 4/1962 | Deal et al. | 204—35 N X |
| 3,072,543 | 1/1963 | Lubow et al. | 204—38 A |
| 3,264,142 | 8/1966 | Wainer | 204—38 A X |
| 3,365,377 | 1/1968 | Michelson | 204—35 N |
| 3,382,160 | 5/1968 | Asada | 204—35 N |
| 3,418,218 | 12/1968 | Levy | 204—35 N |
| 3,440,150 | 4/1969 | Kramer et al. | 204—35 N |
| 3,468,766 | 9/1969 | Lang | 204—35 N |
| 2,540,602 | 2/1951 | Thomas et al. | 204—58 |
| 2,519,488 | 8/1950 | Mack | 204—35 N |

OTHER REFERENCES

Pullen, "The Metal Industry," Sept. 18, 1936, pp. 293–5. 204—58

Wernick et al., "The Surface Treatment and Finishing of Aluminum," 1964, Draper Ltd., Eng., p. 161.

JOHN H. MACK, Primary Examiner

R. J. FAY, Assistant Examiner

U.S. Cl. X.R.

204—58, 140.5